HYBRID DIGITAL-ANALOG NONLINEAR FUNCTION GENERATOR

Filed Dec. 26, 1962

Inventors:
Walter R. Seegmiller,
Edwin C. Underkoffler,
by [signature]
Their Agent.

HYBRID DIGITAL-ANALOG NONLINEAR FUNCTION GENERATOR

Filed Dec. 26, 1962 2 Sheets-Sheet 2

Inventors:
Walter R. Seegmiller,
Edwin C. Underkoffler,
by [signature]
Their Agent.

United States Patent Office 3,264,457

Patented August 2, 1966

3,264,457

HYBRID DIGITAL-ANALOG NONLINEAR FUNCTION GENERATOR

Walter R. Seegmiller, Scotia, and Edwin C. Underkoffler, Schenectady, N.Y., assignors to General Electric Company, a corporation of New York Filed Dec. 26, 1962, Ser. No. 247,224
4 Claims. (Cl. 235—150.53)

Figure 1:
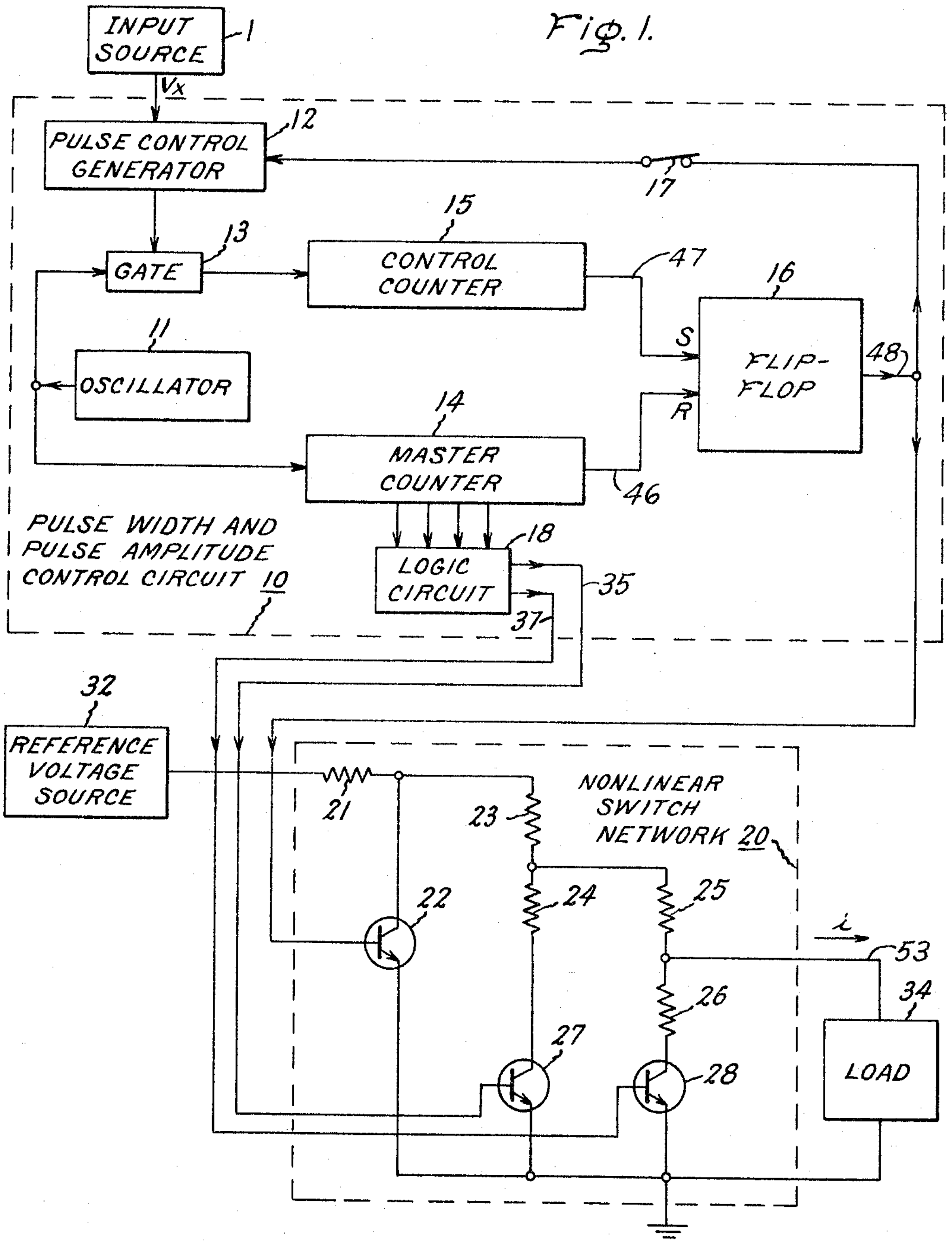

This invention relates to electronic apparatus for generating nonlinear functions for applications such as analog computers and hybrid digital-analog systems in which information is represented in part by variable pulse widths. It is particularly useful for enabling multiplication of variables in applications having requirements presently fulfilled by nonlinear electromechanical potentiometers.

A successful solution for many problems, particularly reliability, associated with electromechanical components used in many analog computer systems is the use of hybrid digital-analog computer components. The primary building block for these systems in a pulse-width multiplier as disclosed in the copending patent application of Walter R. Seegmiller, Serial No. 198,889, filed May 31, 1962. This multiplier includes an output solid state switch which is cyclically opened and closed so that the average time for which the switch is closed is proportional to an input voltage or current representing a variable. When a voltage proportional to a second variable is applied in series with the switch, the average integrated voltage is proportional to the product of the variables. If a constant reference voltage is applied in series with the switch, the multiplier is reduced to a single variable function generator in which the average output voltage is a linear function of the input voltage or current. Such a device operates as a converter which converts an amplitude modulated signal to a pulse-width modulated signal.

These hybrid digital-analog pulse width devices have excellent characteristics in respect to accuracy, reliability, long life, etc. However, problems have been presented where nonlinear function generation has been required. For example, in flight control systems of the self-adaptive type, it is frequently desirable to introduce nonlinearity in the feedback gain changing elements. In some cases, this function can be achieved by modifying the input signal directly. However, it is generally unsatisfactory to custom design each such input circuit and this approach is quite limited in respect to the range of nonlinear functions which can be generated and the accuracy obtainable.

Accordingly, it is an object of the invention to provide a general purpose nonlinear function generator of a hybrid digital-analog construction.

It is a further object of the invention to provide a hybrid digital-analog multiplier in which a nonlinear function of a first variable is multiplied by a second variable.

It is a further object of the invention to provide a hybrid digital-analog function generator of the pulse width type which requires no moving parts.

Briefly stated, in accordance with certain aspects of the invention, a nonlinear function generator is provided by modification of a hybrid digital-analog pulse width multiplier such as described in the above referenced Seegmiller application. Nonlinearity is introduced in the output circuit which provides variable attenuation for voltages applied thereto by means of switched impedance networks. Control circuitry is provided in the cycle multiplier pulse width modulator including a master and a control counter to control switching of the network in such a manner that the output voltage is varied in time duration in each cycle in accordance with a variable input voltage. To introduce nonlinearity in the output, amplitude variations are introduced. These variations are produced by attenuation of the output signal so that as the output signal sweeps over the time increments corresponding to the possible values of the input variables, the integral of the output signal corresponds to the desired function. This operation is implemented by an impedance network which includes switches to change the effective impedance. These switches are controlled by a logic circuit coupled to the master counter so that the impedance network is switched at the appropriate count.

Figures 2A, 2B, 2C, 2D, 2E, 2F, 2G, 2H:
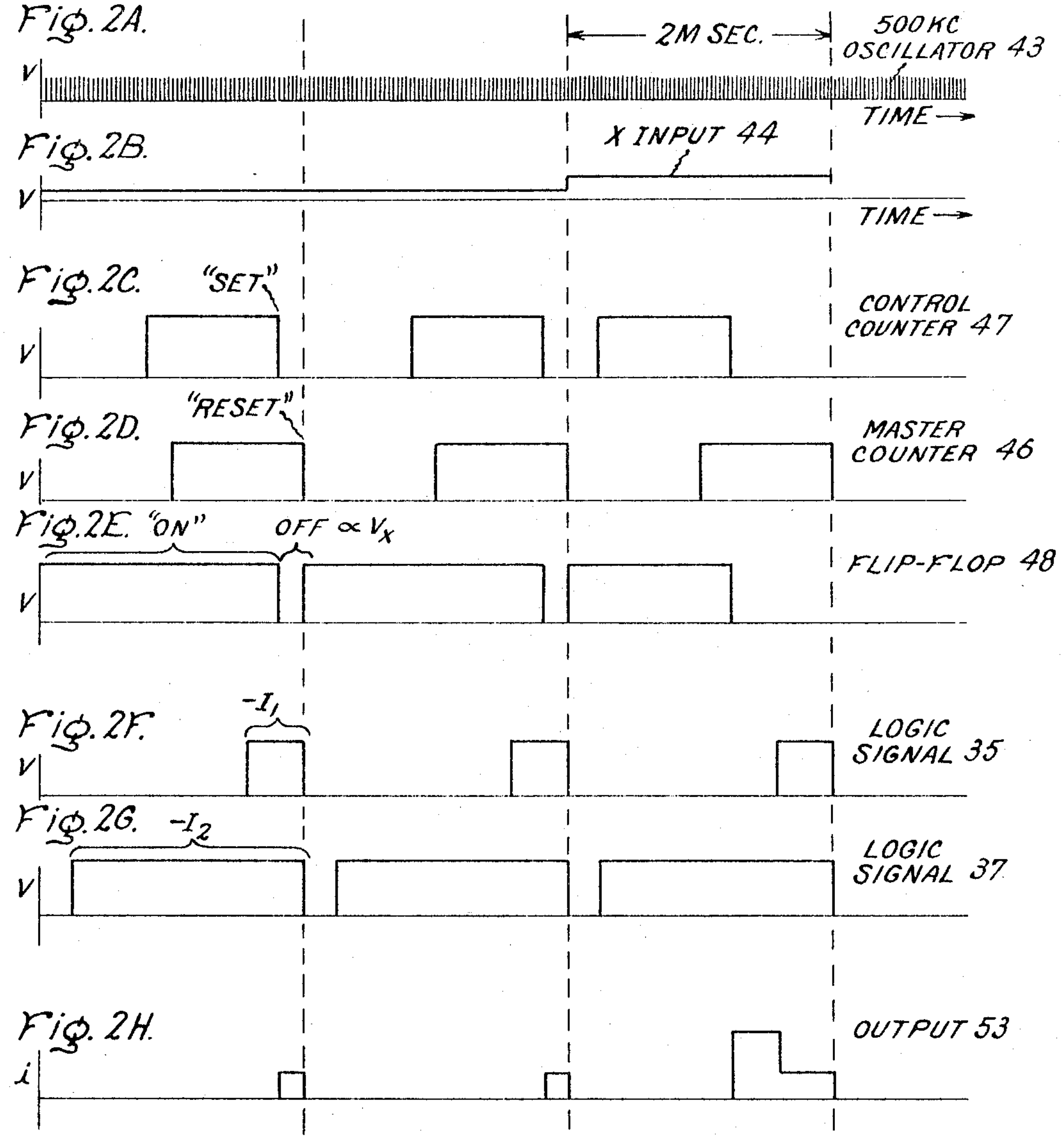
Figure 3:
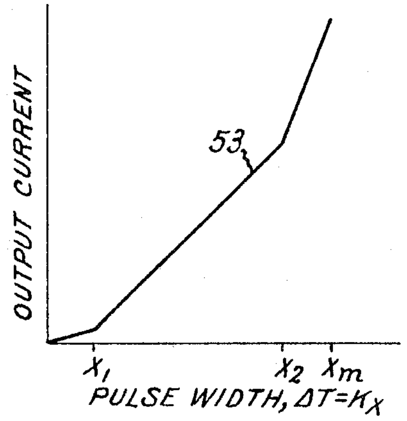

These and other objects and features of the present invention will become apparent from the accompanying detailed description and drawings in which:

FIGURE 1 is a schematic diagram of a simple embodiment of the nonlinear function generator;

FIGURES 2A–H are waveforms illustrative of the operation of the FIGURE 1 embodiment (not to scale); and FIGURE 3 is a graph illustrating the integrated output as a function of an input quantity $x$ for the embodiment of FIGURE 1.

Referring now to the drawings, FIGURE 1 is an illustrative embodiment of the invention. This embodiment incorporates a pulse width and pulse amplitude control circuit 10 which is a linear pulse width multiplier with the addition of logic circuits to generate additional switching signals and a nonlinear switch network 20 for varying the current amplitude in the output load 34 by the controlled attenuation of the voltage applied from the voltage reference source 32.

The pulse width and amplitude control circuit 10 produces a train of rectangular control pulses having a pulse width which is inversely proportional to the input variable $V_x$. The input $V_x$ is in analog form from a source such as another hybrid digital-analog pulse device or an analog input source 1 and is applied to the circuit in the form of analog voltage from pulse control generator 12 which receives the input signal $V_x$ (FIGURE 2B) having an amplitude proportional to $V_x$. These signals are applied to a gate 13 which controls the input to a control counter 15 by blocking the appropriate number of pulses. A similar master counter 14 having the same counting capacity as control counter 15 is also provided. Both counters are driven by an oscillator 11 providing clock pulses (FIGURE 2A) and the outputs of the master counter 14 and control counter 15 are respectively connected to the "RESET" (R) and "SET" (S) inputs of the flip-flop 16 which produces positive pulse width control signals 48 (FIGURE 2E). The counters therefore operate as frequency dividers producing output pulses 46, 47 each time the applied pulses from oscillator 11 reach the capacity of the counter (FIGURES 2C and 2D). In the absence of any $V_x$ signals, the counters will simultaneously produce output pulses, but the components will be arranged so that the flip-flop 16 will remain in the "RESET" condition. It is the trailing edge of the pulses which controls the flip-flop condition and as the blocking pulses are applied, the control counter 15 falls behind the master counter 14, thereby decreasing the pulse width. The result is that there is a time differential, $\Delta T$, between the application of pulses to the RESET and SET inputs of flip-flop 16. That is, $\Delta T=kx$ where $k$ is the chosen constant for the system. During this time differential, the flip-flop provides a continuous output signal representing in pulse duration 48 (FIGURE 2E) the value of the input quantity, $V_x$.

The pulse-width control portion of the control circuit 10 incorporates conventional components and these components are preferably arranged in accordance with the above cited Seegmiller application. The oscillator 11 can be a free-running multivibrator operating at a 500 kc. frequency and the counters are conveniently binary chains of ten flip-flops providing a $2^{10}$ frequency division which products 488 repetitions or cycles per second. The gate 13 is a gated single-shot multivibrator with a pulse output of 0.5 microsecond. The single-shot multivibrator produces pulses at the same 500 kc. frequency as the free-running multivibrator in the absence of an input signal from pulse control generator 12.

Control acton is initiated by control pulse generator 12 which can be any conventional circuit adapted to respond to an analog signal as an input and provide a pulse width modulated output signal, the width or duration of the pulse output being proportional to the magnitude of the analog input signal and the polarity of the pulse output being determined by the polarity of the analog input signal. A convenient circuit to accomplish this function may consist of a half wave push-pull magnetic amplifier firing circuit which is used to render conductive two controlled rectifiers. Analog signals applied to control windings of the magnetic amplifier advance the conduction or firing angle of one controlled rectifier and retard the firing angle of the other, thereby producing a pulse-width modulated output signal with a fixed amplitude as determined by a suitable voltage limiting circuit incorporated therein. The output of control pulse generator 12 is thus a pulse width modulated output having a fixed amplitude and comprising a pulse or series of control pulses of variable duration.

In addition to the pulse width control signal, modulator 10 produces control signals for amplitude modulation in accordance with the desired nonlinear function which control semiconductor switches in the nonlinear network 20. These signals are provided by logic circuit 18. This circuit is conveniently comprised of conventional logic gates which are connected to the appropriate outputs of the individual flip-flops in master counter 14 so that a flip-flop signal generator produces control signals 35 and 37 (in the same manner as flip-flop 16) in accordance with predetermined counts in the counter 14. The control signals 35 and 37 (FIGURES 2F and 2G) are selected in accordance with the desired function. In the embodiment of FIGURE 1, the control signal 35 is a positive voltage when the master counter 14 is at a predetermined count such as 128. Similarly, control signal 37 is cut off at a higher count.

The nonlinear network 20 provides the cyclic switching and variable attenuation within each cycle as controlled by the switching signals from modulator 10. The reference voltage source 32 is connected in series with resistor 21, the rest of the impedance network 20, and the load 34. Voltage applied to the load is varied in time duration by a switching transistor 22 which shunts the reference voltage to ground when the flip-flop 16 generates a positive control signal that is applied to the base of switching transistor 22. As a result, a train of current pulses 53 (FIGURE 2H) are applied to the load 34 in which the pulse-widths are proportional to the time a ground control signal is applied to the base of transistor 22. In addition to this pulse time variation, the reference voltage is varied in amplitude by the resistance network comprised of resistors 23–26. These resistors act as voltage dividers which are effective when a control signal 35 or 37 is applied to the respective switching transistors 27 and 28. The overall repetitive effect of the network is that transistors 27 and 28 are successively switched at predetermined values of $x$ so that integrated portions of the current are shunted to ground in accordance with the desired function and portions of the function are switched in accordance with the value of $x$ by transistor 22.

FIGURE 3 is a graph illustrating the overall operation of the FIGURE 1 embodiment. The function to be generated is one where $f(x)$ is an increasing function of $x$ comprised of adjacent segments within each of which $f(x)$ increases linearly with increasing $x$. Expressed analytically, $$f(x)=C_1x$$
$$f(x)=C_2(x-x_1)+C_1x_1$$
$$f(x)=C_3(x-x_2)+C_1x_1+C_2(x_2-x_1)$$
$$O\leqq x\leqq x_1$$
$$x_1\leqq x\leqq x_2$$
$$x_2\leqq x\leqq x_{max}$$

where $x_1$, $x_2$ and $x_{max}$ are constants which fix the ranges of $x$ within which $f(x)$ is linear; and $C_1$, $C_2$ and $C_3$ are constants which determine the slope of $f(x)$ within each range. The output current 53 is representative of both the load current during each cycle and the average load over a number of cycles in which the accumulated value of $x$ is unchanged.

In the operation of the FIGURE 1 embodiment, the feedback from flip-flop 16 is degeneratively coupled to the pulse control generator 12 so that, over an integral number of cycles, the average value of the control signal switching transistor 22 is precisely proportional to the average integrated value of input signal $V_x$. However, the control circuit 10 can operate in a different mode. When switch 17 is open, the circuit 10 operates as an integrator which stores the applied input. Without feedback through switch 17, the counters will maintain their count differential indefinitely and additional inputs from pulse control generator 12, "ADD" or "SUBTRACT," will be algebraically stored. A SUBTRACT signal will block the pulses from the free-running multivibrator for the period that the SUBTRACT signal persists. An ADD signal causes the single-shot multivibrator 13 to produce counting pulses at twice the 500 kc. frequency, by gating in pulses from both outputs of the multivibrator, for the period that the ADD signal persists.

The invention can be implemented with many variations from the FIGURE 1 embodiment. For exmaple, the nonlinear switch network 20 can be comprised of parallel impedances between the reference voltage source 32 and the load 34, each impedance having a switch such as a transistor in a normally "OFF" condition but switched "ON" in its turn by logic circuit 18. Further variations include the introduction of auxiliary voltage sources in nonlinear network 20 to introduce changes in the sign of the slope for complex nonlinear functions.

In most applications, a large number of multiplication and nonlinear function generation operations are required. This sharply reduces the number of components required for each operation because some components do not require duplication for each operation. For example, oscillator 11 can obviously serve as a source of clock pulses for an entire system. Similarly, master counter 14 can provide the reference pulses for both the function generators and the multipliers. Also, logic circuit 18 conveniently provides control signals for all function generators. This is achieved by arranging the logic circuit 18 to generate common switching signals. These switching signals would cover the full scale pulse width of the system, each switching signal conveniently covering equal increments such as one sixteenth of the maximum width. The desired function is then approximated by the switching of the appropriate switches in the nonlinear switch network 20.

The nonlinear function generator provides a circuit easily adaptable for many applications. For example, in the majority of applications, it is desirable to multiply the generated function by a second variable such as $y \sin x$. This is implemented by having reference voltage source 32 provide a voltage proportional to the variable $y$ while the nonlinear switch network introduces the function sin $x$ in accordance with the input signal representing $x$ from source 1. Although the input source 1 has been described as providing an analog input signal, a major advantage of the hybrid digital-analog circuitry is that information in the form of digital signals can be directly introduced by being gated to the counter 15 to directly produce a count differential between the counters.

In the nonlinear switch network 20, the switching transistors are arranged with their emitters grounded. This arrangement insures highly reliable switching operation. However, the network 20 can take numerous forms. For example, the network can be frequently simplified by providing parallel amplitude setting resistors between the reference voltage source 32 and the load 34. Each amplitude switching transistor, or other switching element, is then arranged in series with each resistor.

While particular embodiments of the invention have been shown and described herein, it is not intended that the invention be limited to such disclosure, but that changes and modifications can be made and incorporated within the scope of the claims.

What is claimed is:

1. A nonlinear function generator comprising:
   (a) first and second pulse counters having the same count capacity and adapted to produce a control signal upon reaching their limits;
   (b) means to apply constant frequency pulses to both of said counters in parallel;
   (c) input control means producing a count differential in said first counter in respect to said second counter in accordance with an input signal representing a variable;
   (d) an output switching network including a switching element controlled by said counters to vary the pulse width of a reference signal applied thereto by a cyclic switching in accordance with the count differential in said counters;
   (e) variable impedance means in said switching network for varying the amplitude of said reference signal; and
   (f) logic means responsive to the count in said second counter to switch said variable impedance means in accordance with the desired nonlinear function of the input variable.

2. An electronic circuit for generating pulse-width output signals modulated in accordance with a nonlinear function comprising:
   (a) a high frequency pulse source;
   (b) two pulse counters, said two pulse counters actuated by the high frequency pulse source to run in synchronism in the absence of any control action;
   (c) a pulse gate circuit for rendering one of said pulse counters responsive to an analog input signal to thereby provide a control action, said control action effecting a phase displacement between outputs of the two pulse counters to develop a pulse-width control signal;
   (d) variable impedance means for varying the amplitude of the said pulse-width control signal; and
   (e) logic means responsive to one of said counters to switch said variable impedance means in accordance with the desired nonlinear function of the input variable.

3. A hybrid digital-analog function generator producing an output in the form of a train of pulses occurring at a fixed frequency in which the average pulse area represents a nonlinear function of a variable input quantity comprising:
   (a) means to supply constant frequency counter pulses;
   (b) first and second pulse counters synchronously driven by said counter pulses, said counters being adapted to cyclically produce control pulses at the pulse train frequency;
   (c) input pulse gating means for controlling said first counter in response to an analog signal representing a variable quantity so as to produce a count differential in said counters relative to the cyclic control pulses;
   (d) a first output switch responsive to said cyclic control pulses to produce an output in accordance with the count differential in said counters;
   (e) additional output circuits including switches for varying the output signals in accordance with a nonlinear function; and
   (f) a logic circuit responsive to the count in said second counter to produce switching signals to switch said additional output circuits so as to provide an output signal representing the nonlinear function of said input signal representing a variable quantity.

4. A hybrid digital-analog function generator producing an output in the form of a train of pulses occurring at a fixed frequency in which the average pulse area is proportional to a nonlinear function of a variable input quantity comprising:
   (a) oscillator means to supply constant frequency counter pulses;
   (b) first and second pulse counter synchronously driven by said counter pulses, said counters being adapted to cyclically produce control pulses at the pulse train frequency;
   (c) input pulse gating means for controlling the application of pulses to said first counter in response to a variable voltage signal representing a first variable quantity so as to produce and store a count differential in said counters relative to the cyclic control pulses;
   (d) a first output switch responsive to said cyclic control pulses to produce an output in accordance with the count differential in said counters;
   (e) additional output circuitry including switches for varying the output signal amplitude in accordance with a nonlinear function;
   (f) a logic circuit responsive to the count in said second counter to produce switching signals to switch said additional output circuits so as to provide an output signal representing the nonlinear function of said input signal representing a variable quantity; and
   (g) a signal source coupled in series with said output switches to provide the output signals, said signal source introducing a signal representing a second variable whereby the output signal represents the product of the second variable and the function of the first variable.

References Cited by the Examiner

UNITED STATES PATENTS

| | | | |
|---|---|---|---|
| 2,921,740 | 1/1960 | Dobbins et al. | |
| 2,966,302 | 12/1960 | Woolf et al. | 235—194 X |
| 3,050,708 | 8/1962 | Alstyne et al. | 235—197 X |
| 3,067,940 | 12/1962 | Preston | 235—194 X |
| 3,080,555 | 3/1963 | Vadus et al. | |
| 3,177,350 | 4/1965 | Abbott et al. | |

MALCOLM A. MORRISON, *Primary Examiner.*

I. KESCHNER, *Assistant Examiner.*